United States Patent
Kazama et al.

(10) Patent No.: US 8,438,931 B2
(45) Date of Patent: May 14, 2013

(54) SEMICONDUCTOR STRAIN SENSOR

(75) Inventors: Atsushi Kazama, Mito (JP); Ryoji Okada, Kasumigaura (JP); Tetsurou Kawai, Kumagaya (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/674,419

(22) PCT Filed: Jul. 25, 2008

(86) PCT No.: PCT/JP2008/063354
§ 371 (c)(1),
(2), (4) Date: Jun. 9, 2011

(87) PCT Pub. No.: WO2009/028283
PCT Pub. Date: Mar. 5, 2009

(65) Prior Publication Data
US 2011/0227178 A1  Sep. 22, 2011

(30) Foreign Application Priority Data
Aug. 27, 2007 (JP) ................... 2007-219342
Sep. 25, 2007 (JP) ................... 2007-246695

(51) Int. Cl.
*G01L 1/22* (2006.01)
(52) U.S. Cl.
USPC .............. 73/777; 73/774; 257/417; 257/419
(58) Field of Classification Search ............ 73/777, 73/775, 774; 257/417, 419, 415, E29.324
See application file for complete search history.

(56) References Cited

U.S. PATENT DOCUMENTS
3,123,788 A * 3/1964 Pfann et al. .............. 338/4
4,498,229 A * 2/1985 Wilner ...................... 438/52
(Continued)

FOREIGN PATENT DOCUMENTS
EP  1 510 825 A1  3/2005
GB  2 128 404 A  4/1984
(Continued)

OTHER PUBLICATIONS
Office Action in Chinese Patent Appln. 200880103012, dated May 3, 2012, (in Chinese, 6 pages); including partial English language translation (5 pages).
(Continued)

*Primary Examiner* — Michael Shingleton
(74) *Attorney, Agent, or Firm* — Antonelli, Terry, Stout & Kraus, LLP.

(57) ABSTRACT

A semiconductor strain sensor having a strain sensor chip composed of a semiconductor substrate having a piezoresistive element as a strain detection section. The semiconductor strain sensor has a stable characteristic for a long period of time and a stable conversion factor of a strain generated in the strain sensor chip corresponding to a strain of an object to be measured, within a strain range of a size to be measured. The strain sensor chip is bonded to a metal base plate with a metal bonding material. The metal base plate has two or four extending members, which protrude from a side of the strain sensor chip for attaching the strain senor chip to the object to be measured. Preferably, a groove is arranged between a metal base plate undersurface area, which corresponds to the bonding area where the strain sensor chip is bonded to the metal base plate, and the undersurfaces of the extending members, and a protruding section sandwiched by the grooves is arranged on the undersurface of the metal base plate.

10 Claims, 10 Drawing Sheets

U.S. PATENT DOCUMENTS

| | | | |
|---|---|---|---|
| 5,575,577 A | 11/1996 | Kawakami et al. | |
| 2004/0232507 A1 | 11/2004 | Furukubo et al. | |
| 2007/0022808 A1* | 2/2007 | Tanaka et al. | 73/170.09 |
| 2009/0301215 A1* | 12/2009 | McDearmon et al. | 73/774 |

FOREIGN PATENT DOCUMENTS

| | | |
|---|---|---|
| JP | 54-129889 | 10/1979 |
| JP | 56-142431 | 11/1981 |
| JP | 59-132173 | 7/1984 |
| JP | 59-137503 | 9/1984 |
| JP | 07-035628 | 2/1995 |
| JP | 07-081171 | 3/1995 |
| JP | 08-139267 | 5/1996 |
| JP | 2001-264188 | 9/2001 |
| JP | 2001-272287 | 10/2001 |
| JP | 2003-262548 | 9/2003 |
| JP | 2007-059736 | 3/2007 |
| WO | WO 03/102601 | 12/2003 |

OTHER PUBLICATIONS

In PCT/JP2008/063354, 'Notification of Transmittal of Copies of Translation of the International Preliminary Report on Patentability and Written Opinion of the ISA,' mailed Mar. 18, 2010. [7 pages].

* cited by examiner

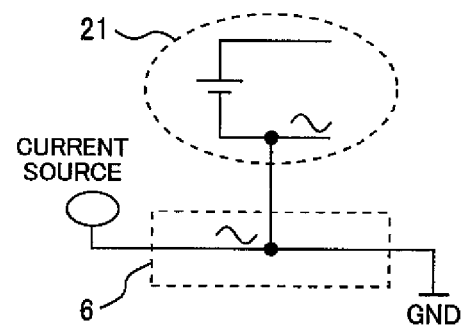
FIG. 3A
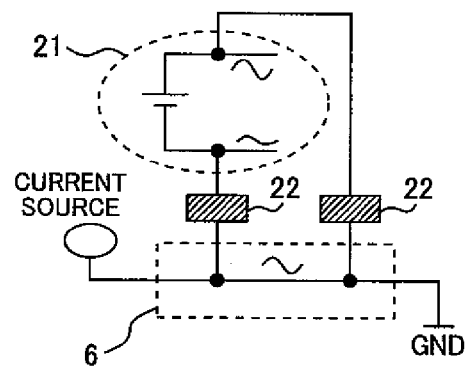
FIG. 3B
FIG. 4
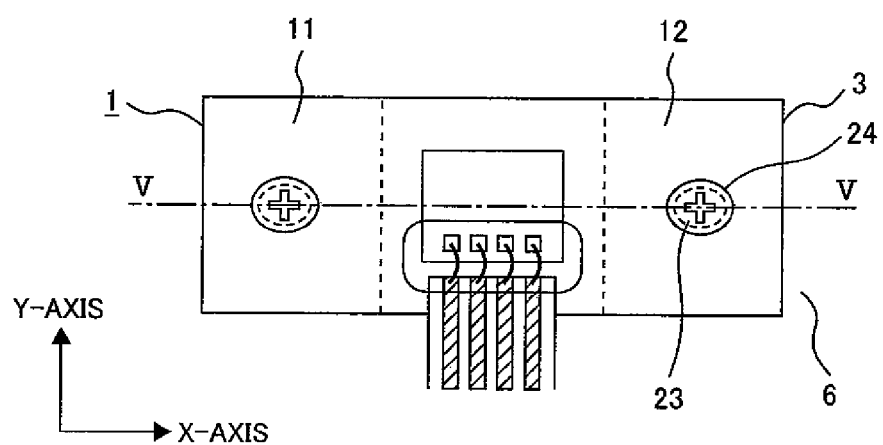

SEMICONDUCTOR STRAIN SENSOR

TECHNICAL FIELD

The present invention relates to a strain sensor which can be used for measuring strain and stress of a structure. More specifically, it relates to a semiconductor strain sensor using a semiconductor strain gauge.

BACKGROUND ART

The strain gauge used for measuring strain and stress of a structure is configured such that a circuit pattern formed by a metal thin film of Cu—Ni series alloys or Ni—Cr series alloys is covered with a flexible polyimide or epoxy resin film. Such a strain gauge is employed by being bonded to an object with use of an adhesive. If the circuit pattern of the metal thin film is strained and deformed, change in resistance is generated and an amount of the strain can be measured thereby.

There is also a semiconductor strain gauge which uses, in place of the metal thin film, a semiconductor piezoresistive element formed by doping an impurity to a semiconductor such as silicon as a strain detection section. The resistance change rate for the strain of the semiconductor strain gauge is several 10 times as large as that of the strain gauge using the metal thin film and can measure a minute strain. Moreover, since the resistance change rate of the strain gauge of the metal thin film is small, an obtained electric signal must be amplified, requiring an amplifier. Since the resistance change of the semiconductor strain gauge is large, an obtained electric signal can be used without help of an amplifier. Alternatively, it is possible to prepare an amplifier circuit in a chip of the semiconductor strain gauge. Therefore, it is expected that use and usability of the strain sensor will be extended greatly. In the present specification, a "strain sensor" is used as a synonym to a "strain gauge."

Impurity doping is performed on a silicon wafer using a semiconductor production technology. Then, a wiring is formed to produce a chip and to obtain a semiconductor strain gauge. It is important that the strain of the object to be measured is correctly transmitted to the chip (hereafter, called a "strain sensor chip"). The points here are modularization of the strain sensor chip and attachment to the object to be measured.

Patent Document 1 discloses a structure in which a semiconductor strain gauge is made into a practical module. FIG. 16A is a perspective view showing such the semiconductor strain gauge. The semiconductor strain gauge is formed on a surface of a silicon wafer. Then, the silicon wafer is etched until it comes to have a thickness of several micrometers to produce a chip. Thus, a strain sensor chip 52 is obtained. A wiring 53 is formed and is sandwiched by polyimide films 54 to obtain a semiconductor strain gauge 51. Since the strain sensor chip 52 and the wiring 53 are modularized, the semiconductor strain gauge can be treated like a conventional strain gauge.

Patent Document 2 discloses a strain detection sensor 56 in which a strain sensor chip 52 is bonded to a glass pedestal 57 with use of a low-melting-point glass 58. FIG. 16B shows a side view of the strain detection sensor 56. The glass pedestal 57 is fixed to an object to be measured by bolts etc. Resin adhesives are not inserted between the strain sensor chip 52 and the glass pedestal 57 and between the glass pedestal 57 and the object to be measured, respectively. Therefore, a temperature drift, which may be caused by a difference in thermal expansion coefficients between the adhesive resin and the strain detection sensor, can be avoided.

Patent Document 1: JP-A-2001-264188
Patent Document 2: JP-A-2001-272287

DISCLOSURE OF THE INVENTION

Problem to the Solved by the Invention

As in the case of the conventional strain gauges using the metal thin film, the semiconductor strain gauge of Patent Document 1 can be used by being bonded to the object to be measured with use of a resin adhesive. Because of the use of the resin adhesive, there was a problem that strain detection sensitivity and zero point varies due to deterioration or degradation of the resin adhesive. This poses a problem from an aspect of stability of characteristics when using it for a long period of time. Since a highly sensitive semiconductor strain gauge is used, the influence on characteristic change appears more notably.

The resin adhesive is not used in the strain detection sensor of Patent Document 2. Therefore, it is considered that its long-term stability is good as compared with the semiconductor strain gauge of Patent Document 1. However, a problem lies in how the strain taking place in the object to be measured is transmitted to a strain sensor chip. Considering the handling at the time of assembly, a certain amount of thickness is required for the strain sensor chip of Patent Document 2. Because of such a thickness, the strain sensor chip itself has rigidity which is not negligible. Therefore, the pedestal 57 to which the strain sensor chip 52 is bonded does not have uniform rigidity as a whole. As shown in FIG. 17A, in the strain detection sensor 56 attached to the object 6 to be measured with bolts 24, for example, suppose that a tensile strain in a direction shown by an arrow is added to the object 6 to be measured. In accordance with displacement between the bolts, a force is applied from the bolts 24 to the pedestal 57. Because of the rigidity of the strain sensor chip 52, the strain generated in the whole pedestal is not uniform. The strain generated on a surface of the strain sensor chip where the strain detection section 59 exists becomes different from the strain of the object 6 to be measured.

As shown in FIG. 17B, suppose the strain of the strain sensor chip 52 is proportional to the strain of the object 6 to be measured within a required measuring range. In such a case, with use of inclination of a graph showing a conversion factor of the strain, the strain of the object to be measured can be calculated from the detection value of the strain sensor chip. In fact, an output of the strain sensor is obtained by output change of a voltage caused by a change in piezo resistance. When it is multiplied by the conversion factor of the strain, the strain of the object 6 to be measured is obtained.

In Patent Document 2, as shown in FIG. 18, a strain sensor chip 52 is bonded to a simple plate-like pedestal 57 with use of a low-melting-point glass 58. In an area where the strain sensor chip 52 is bonded, rigidity is biased to a side of a face to which the strain sensor chip is bonded. Therefore, for example, when the pedestal 57 is pulled following the displacement of the object 6 to be measured in a direction shown by an arrow, flexural deformation occurs in the pedestal 57. When the flexural deformation occurs, inclination of the strain is caused in a thickness direction of the strain sensor chip 52, and the strain of the strain detection section 59 on a surface of the strain sensor chip becomes remarkably different from the strain of the object 6 to be measured. In an extreme case, when the pedestal 57 is pulled, compression strain is generated in the strain detection section 59. This means that a plane strain of the object 6 to be measured is converted to flexion of the strain sensor chip 52 and detected. That is, if the conversion factor of the strain is small, sensitivity falls. If the flexural deformation occurs in the strain sensor chip 52, because of the change in a contact state between the pedestal 57 and the object 6 to be measured, a nonlinear behavior is shown. Therefore, it becomes difficult to keep the conversion factor of strain constant within a measurement range. At the same time, variation of the conversion factor with the strain sensor becomes greater. Such a problem can be suppressed when the pedestal 57 is allowed to be sufficiently thick with respect to the thickness of the strain sensor chip 52. However, the rigidity of the whole sensor module including the pedestal becomes high, and the influence on the deformation itself of the object to be measured becomes greater.

An object of the present invention is to provide a semiconductor strain sensor using a highly sensitive semiconductor strain gauge, its characteristics are stable for a long time, flexural deformation of the strain sensor is prevented, and a conversion factor of a strain generated in the strain sensor chip corresponding to a strain of the object to be measured is stable within a strain measuring range.

Means for Solving the Problem

A semiconductor strain sensor of the present invention comprises a strain sensor chip made of a semiconductor substrate having a piezoresistive element on an upper surface thereof, a metal base plate having a bonding area to which an undersurface of the strain sensor chip is bonded with a metal bonding material, the metal base plate having at least two extending members, which protrude from a side of the bonding area and have a connection area on an undersurface of the metal base plate opposed to the bonding area for attaching the strain sensor chip to a surface of an object to be measured; and a wiring member connected to an electrode of the piezoresistive element that the strain sensor chip has and drawn outward.

The strain sensor chip is bonded to the metal base plate with use of a metal material. The heat generated in the strain sensor chip is transmitted to the metal base plate from a back surface of the sensor chip and is radiated. The metal base plate is a flat plate whose area is larger than that of the strain sensor chip, and heat dissipation is performed efficiently. Since the heat dissipation is good, it can prevent a rise in temperature of the strain sensor chip, and it is easy to keep the temperatures of the metal base plate and the strain sensor chip constant. The temperature of the semiconductor strain sensor can be made constant. Therefore, it is possible to avoid the characteristic change caused by the variation of the piezo resistance coefficient by change in temperature and caused by variation of stress applied to the piezoresistive element due to thermal deformation caused by the uneven temperature of the strain sensor chip and the metal base plate. Moreover, the strain sensor chip and the metal base plate are metal-bonded. Therefore, the bonded part is unlikely to have creep, deterioration, or degradation, being excellent in long-term stability of the characteristics.

The base plate with which the strain sensor chip is attached to the object to be measured is composed of conductive materials. Therefore, it is not easily affected by an electric noise. Suppose that an insulating material is inserted between the strain sensor chip and the object to be measured. When a current flows in the object to be measured and the potential varies, parasitic capacitance is produced between each part of the strain sensor chip and the object to be measured. If the parasitic capacitance is produced, the potential also varies, and noise is liable to occur. In the semiconductor strain sensor of the present invention the ground of the strain sensor chip is electrically connected to the object to be measured from the back surface of the sensor chip. Therefore, the ground of the strain sensor chip matches the potential of the object to be measured, and a noise is hardly generated.

As a metal base plate, metals such as nickel, iron, and copper etc, or alloys such as stainless steel can be used. If a material whose thermal expansion coefficient is about the same as that of silicon such as iron-nickel series alloys or iron-nickel-cobalt series alloys, characteristic change caused by change in temperature can be made small. As described above, since the undersurface of the strain sensor chip is bonded to the surface of the metal base plate with a metal bonding material, the metal base plate has a melting point sufficiently higher than the melting point of the metal bonding material so that the metal base plate may not be melt and deformed at the time of bonding.

As described above, the strain sensor chip is metal-bonded to the metal base plate having a large area. Therefore, the metal base plate protrudes from a side of the strain sensor chip as an extending member. Two or four extending members sandwich the strain sensor chip. The extending member has a connection area on an undersurface of the metal base plate, and the semiconductor strain sensor is fixed to the object to be measured through the connection area. The metal base plate has two or four extending members, and each extending member has one connection area. When the metal base plate has two extending members, there are two connection areas across an area on the undersurface of the metal base plate corresponding to a bonding area with which the strain sensor chip is bonded to the metal base plate. Further, one connection area, the area on the undersurface of the metal base plate corresponding to the bonding area, and other connection areas are on a straight line. When the metal base plate has four extending members, they protrude from four sides of the bonding area with which the strain sensor chip is bonded to the metal base plate. There are connection areas on the outside of the four sides of the area on the undersurface of the metal base plate corresponding to the bonding area. Each two of the four connecting areas and the bonding area are on a straight line.

Of the four connection areas, the two connection areas on the straight line sandwiching the bonding area are called a "first connection area" and a "second connection area", respectively. Further, the two connection areas provided across the bonding area and being on a straight line perpendicular to the above straight line are called "third connection areas" and a "fourth connection area," respectively. The strain generated in the object to be measured along a direction (referred to as an "X direction") which connects the first connection area with the second connection area is transmitted to the metal base plate and the strain sensor chip through the first and second connection areas. The strain can be detected according to the change in electrical resistance of a semiconductor piezoresistive element. The strain in a direction (referred to as a "Y direction") which connects the third connection area with the fourth connection area is transmitted to the metal base plate and the strain sensor chip through the third and fourth connection areas. The strain can be detected from the change in electrical resistance of the semiconductor piezoresistive element. In the semiconductor strain sensor having two connection areas, the strain in either the X direction or the Y direction alone is measured. However, in the semiconductor strain sensor having four connection areas, the strain in the X direction and the Y direction can be measured.

With use of the semiconductor strain sensor having four connection areas, a strain in a direction forming an angle of 45 degrees with the X and Y directions is detected. Thus, the semiconductor strain sensor can be used as a torque detection sensor.

In the semiconductor strain sensor of the present invention it is preferable that the metal base plate is formed along a line corresponding to the side of the bonding area on the undersurface of the metal base plate, in which the metal base plate has a groove as long as or longer than a length of the side, and the groove separates an area corresponding to the bonding area from the connection areas of the extending members on the undersurface of the metal base plate.

In the undersurface of the metal base plate there is provided the groove between the area corresponding to the bonding area and the connection area of the two extending members. Therefore, the area corresponding to the bonding area on the undersurface of the metal base plate protrudes downward. Further, the protruding area is arranged in a substantially symmetrical relationship with respect to the strain sensor chip. They have the symmetrical relationship between a front surface and a back surface of the semiconductor strain sensor. Therefore, the rigidity of the semiconductor strain sensor becomes substantially symmetrical. Accordingly, when the strain is transmitted from the connection area to the metal base plate, the strain sensor chip becomes less likely to undergo flexural deformation, and the strain conversion factor becomes less likely to be varied.

Further, in the semiconductor strain sensor of the present invention it is preferable that the groove formed along the line corresponding to the side of the bonding area in the undersurface of the metal base extends perpendicularly to a strain detection direction of the strain sensor chip. Further, it is preferable that these grooves are provided at respective positions of the undersurface of the metal base plate corresponding to both sides of the strain sensor chip. Still further, it is preferable that, of side walls of the grooves, a side wall closer to the bonding area is provided corresponding to the side of the bonding area on the undersurface of the metal base plate.

In the undersurface of the metal base plate the area corresponding to the bonding area, which is put between the two grooves, is as long as or longer than the side of the bonding area. Therefore, when the flexural deformation generated in the object to be measured is transmitted to the metal base plate through the connection area of the semiconductor strain sensor, the transmission of the flexural deformation can be prevented by the groove provided in the metal base plate. Thus, the flexural deformation to be generated in the strain sensor chip can be prevented. Therefore, it is preferable that, on the metal base plate, the extending members protrude from the four sides around the circumference of the strain sensor chip and that, on the lines corresponding to four sides on the undersurface of the metal base plate, the grooves are so formed as to surround the area corresponding to the bonding area.

In the semiconductor strain sensor of the present invention, it is preferable that the following formula is satisfied.

$$ts \times Es = td \times Ed$$

where
Es: Young's modulus of the metal base plate,
Ed: Young's modulus of the strain sensor chip,
td: a thickness of the strain sensor chip, and
ts: a depth of the groove.

The above formula does not have to be satisfied completely. It will do so long as the formula is satisfied to an extent where there is a symmetrical relationship between the rigidity of the upper face and the rigidity of the rear face of the metal base plate. Therefore, the above formula can be expressed as follows:

$$ts \times Es \approx td \times Ed$$

By achieving the above relationship, the rigidity of the protrusion placed between the grooves of the metal base plate substantially coincides with the rigidity of the strain sensor chip. Therefore, the symmetrical characteristic of the rigidity of the front surface and the rigidity of the back surface of the semiconductor strain sensor can be improved. That is, when receiving a pulling force or a compressing force from the object to be measured, on a plane of the center of thick part of the metal base portion to which the sensor chip is bonded, because of the substantial symmetrical characteristic of the rigidity on the bonding side of the sensor chip and the rigidity of the opposite metal base side, a curvature of the bonding portion of the sensor chip can be suppressed. As a result, it becomes possible to accurately measure the pulling force and the compressing force of the object to be measured.

In the semiconductor strain sensor of the present invention, it is preferable that the metal base plate has, with respect to a plane of on a central thick part of the metal base plate, a groove arranged in a symmetrical relationship to the groove in the undersurface of the metal base plate in the upper surface of the metal base plate, in which, between the grooves formed in the upper surface, the bonding area is recessed from the upper surface of the metal base plate as much as a depth of the groove. That is, it is preferable that a recess is formed in the front surface of the metal base plate and that the strain sensor chip is provided in the recess.

As described above, the grooves are formed symmetrically in the front surface and the back surface of the metal base plate and the semiconductor strain sensor chip is placed in the recess of the metal base plate. Therefore, symmetrical characteristic of the rigidity of the front surface and the rigidity of the back surface of the metal base plate is further improved and the flexural deformation of the metal base plate is further prevented.

With respect to the semiconductor strain sensor of the present invention, in a cross section in the direction where the two connection areas and the bonding area of the strain sensor chip are connected, it is preferable that a width lb of the groove is expressed as follows:

$$lb = la \times [tb \times (ta - tc)] / [ta \times (tc - tb)]$$

where
ta: a total thickness of the strain sensor chip, the metal base plate, and the metal bonding material in the bonding area of the strain sensor chip,
tb: a thickness of the metal base plate at the bottom of the groove,
tc: a thickness of the metal base plate in the connection area, and
la: a half of the length of the strain sensor chip.

It is not necessary to completely satisfy the above formula, and it will do so long as the above formula is satisfied to an extent where variation in the conversion factor of the strain is prevented. Therefore, the above formula can be expressed as follows:

$$lb \approx la \times [tb \times (ta - tc)] / [ta \times (tc - tb)]$$

By satisfying the above formula, the rigidity of the portion of the metal base plate from the groove to the strain sensor chip bonding area and the strain sensor chip substantially coincide with the rigidity of the metal base plate in the connection area. Therefore, the strain is distributed to each of the two equally. Thus, even if the position of the connection area is changed, variation of the conversion factor of the strain can be made small. Even if the attachment position of the semiconductor strain sensor to be object to be measured changes, the change in the conversion factor of the strain can be prevented.

Now, the details will be explained. If the detected amount of strain varies according to the position of the welding point, measurement accuracy falls remarkably. As a packaging structure, a method must be devised to avoid this phenomenon. In order to do so, the ratio ea/ec between the strain ea that the sensor chip connection area receives due to the deformation of the object to be measured and the strain ec of the connection area from the groove to the welding point should not depend on the length lc from the groove to the welding point but should always be constant. Suppose that the strain of the groove area is eb, the relationship to be achieved is expressed as follows:

$$(la \times ea + lb \times eb)/(la + lb) = ec$$

On the other hand, since the sensor chip bonding area, the groove area, and the connection area are connected in series, the transmitted force is uniform.

That is, $$(ts \times Es + td \times Ed) \times ea = Es \times tb \times eb = Es \times tc \times ec$$

Since $ts \times Es \approx td \times Ed$, the above formula is substantially expressed as follows:

$$Es \times ta \times ea = Es \times tb \times eb = Es \times tc \times ec$$

With use of this formula, the relationship to be achieved can be modified as follows:

$$lb \times [ta \times (tc - tb)] = la \times [tb \times (ta - tc)]$$

This relationship does not have to be strictly satisfied. It will do so long as it is satisfied to an extent where change in the conversion factor of the strain can be prevented.

In the semiconductor strain sensor of the present invention the wiring member can comprise a flexible wiring board whose one end is adhered onto the metal base plate with a resin, a metal wire electrically connecting a wiring of the flexible wiring board with the electrode of the piezoresistive element that the strain sensor chip has, and a resin covering the electrode of the piezoresistive element and the metal wire.

Between the flexible wiring board and the strain sensor chip, electrical conduction can be achieved by ultrasonic-welding or soldering the uncoated metal wire. As for the metal wire, a bare gold wire having a diameter of 10 micrometers to 200 micrometers can be used. By covering the metal wire, its connection part and the electrode with a resin, electrical insulation and interception from the atmosphere can be ensured. Not only the wiring member but the entire strain sensor chip can be covered with the resin. When the rigidity of the flexible wiring board and the adhesives for adhering the wiring board is high, creep, degradation, and deterioration between the flexible wiring board and adhesives may affect the rigidity of the whole semiconductor strain sensor. It is preferable that the elastic modulus of the flexible wiring board and the adhesives is low and their volumes are as small as possible.

In the semiconductor strain sensor of the present invention the wiring member can comprise a metal bump provided on the electrode of the piezoresistive element that the strain sensor chip has, a flexible wiring board having a wiring electrically connected to the metal bump, and a resin filled between the strain sensor chip and the flexible wiring board.

As described above, the metal bump is provided at the electrode of the piezoresistive element arranged in the strain sensor chip. Therefore, the flexible wiring board can be directly connected to the surface of the strain sensor chip, and it is not necessary to bond the flexible wiring board to the metal base plate. Therefore, the freedom of design of the extending member provided on the side part of the strain sensor chip can be raised. It is preferable that the flexible wiring board is made as thin as possible so that it may not affect the rigidity of the semiconductor strain sensor.

In the semiconductor strain sensor of the present invention the wiring member can comprise a base plate electrode formed on the metal base plate through an insulation film a metal wire electrically connecting the base plate electrode with the electrode of the piezoresistive element that the strain sensor chip has and a resin covering the electrode of the piezoresistive element, the metal wire and the base plate electrode.

By using the base plate electrode, the flexible wiring board may be omitted. It is possible that the base plate electrode and the electrode of the strain sensor chip are connected electrically with use of the metal wire, and an electric signal of the strain sensor chip can be taken out of the chip by the coated wire from the base plate electrode. Since the flexible wiring board is not bonded to the metal base plate, the freedom of design of the extending member provided on the side part of the strain sensor chip can be raised. By covering the metal wire as well as its connection part and electrode with resin, electric insulation and the interception from the outside air can be ensured.

In the semiconductor strain sensor of the present invention, it is preferable that the undersurface of the metal base plate of the semiconductor strain sensor is opposed to the object to be measured and that at least part of the connection area of the metal base plate is attached so as to tightly fit the object to be measured.

It is necessary that at least part of the connection area of the metal base plate is tightly fitted to the object to be measured. The strain of the object to be measured is transmitted to the metal base plate through the connection part. Therefore, if the connection area is small, the strain is concentrated on the connection part and the connection part may undergo plastic deformation. If the connection area is large enough not to be plastically deformed by the strain size to be measured, there is no need to bring the whole connection area into close contact with the object to be measured. It is not necessary for the portions other than the connection area of the metal base plate to be inclose contact with the object to be measured.

In the semiconductor strain sensor of the present invention, the semiconductor strain sensor and the object to be measured can be connected through at least two or more connection areas. Further, each connection area is fixed through at least one welding part or more.

For welding, laser welding and resistance spot welding can be used. Since creep, degradation, and deterioration are not likely to take place in the welded part, welding excels in long-term stability. Welding can be performed through metals such as a wax material between the connection area and the object to be measured. If a handy-type spot welder is used, even to the established equipment and structure, the semiconductor strain sensor of the present invention can be easily attached at the work site. Moreover, at the time of attachment, a force may not be directly applied to the strain sensor chip. Therefore, the strain sensor chip may not be destroyed. Further, unnecessary strain is not given so that the characteristics of the strain sensor chip may not be changed.

In the semiconductor strain sensor of the present invention, the semiconductor strain sensor and the object to be measured can be connected through at least two or more connection areas. Further, each connection area can be connected with use of one screw or more.

The semiconductor strain sensor of the present invention can be attached, with screws, to the object to be measured made of a material which cannot be welded. In screw connection when attaching the semiconductor strain sensor, devices such as a laser welding machine and a spot welder are not necessary. Therefore, attachment in a narrow place, at a high position, etc. can be performed easily.

Advantages of the Invention

It becomes possible to provide a semiconductor strain sensor, which uses the highly sensitive semiconductor strain gauge, whose characteristics are stable for a long time, and whose characteristics are not likely to be affected by heat emitted by the strain sensor chip.

BRIEF DESCRIPTION OF THE DRAWINGS

In FIG. 3 FIG. 3A shows an equivalent circuit of a case of the present invention where the strain sensor chip is connected with an object to be measured by a conductive material, and FIG. 3B shows an equivalent circuit in a case where an insulation material is inserted between them.

FIG. 4 is a plan view of a semiconductor strain sensor of Example 2 of the present invention, attached to the object to be measured.

In FIG. 15

In FIG. 16

In FIG. 17

DESCRIPTION OF REFERENCE NUMERALS

Figure 1:
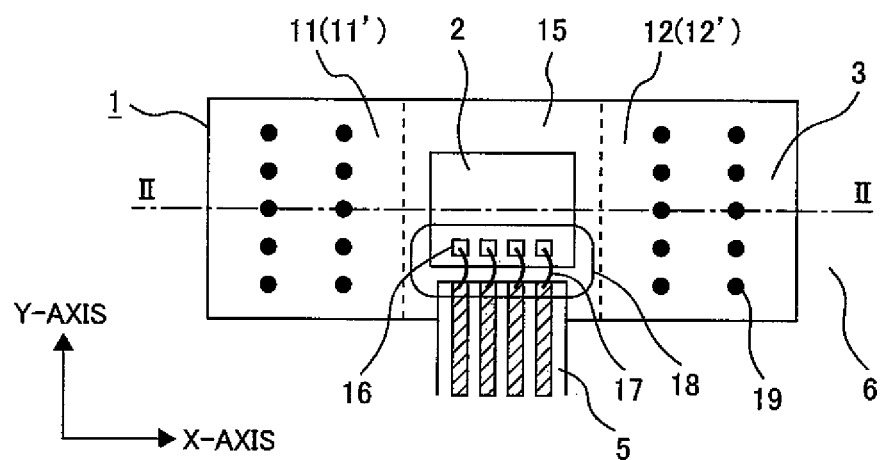
FIG. 1 is a plan view of a semiconductor strain sensor of Example 1 of the present invention, attached to an object to be measured.

1 Semiconductor strain sensor
2 Strain sensor chip
3 Metal base plate
4 Metal bonding material (Metal solder)
5 Flexible wiring board
11, 12 Extending member
11', 12' Connection area
15 Bonding area
16 Electrode
17 Metal wire
18 Resin
26 Metal bump
30, 30', 30a, 30a' Groove

BEST MODE FOR CARRYING OUT THE INVENTION

According to examples, the present invention will be explained in detail with reference to drawings. For the sake of clarity, the same components and parts may be denoted by the same numerals.

EXAMPLE 1

Figure 2:
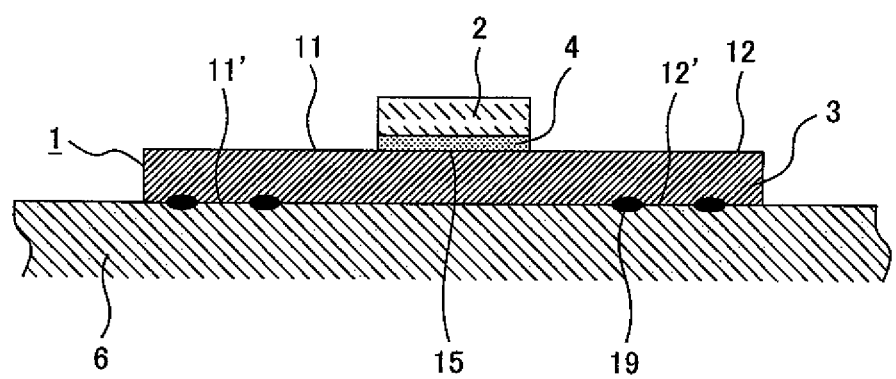
FIG. 2 is a cross-sectional view taken along line II-II of FIG. 1.

With reference to FIGS. 1 and 2, the structure of a semiconductor strain sensor of Example 1 of the present invention will be explained. FIG. 1 is a plan view showing a semiconductor strain sensor of Example 1 attached to an object to be measure, and FIG. 2 is a cross-sectional view taken along line II-II of FIG. 1. A strain sensor chip 2 in which a piezoresistive element (not shown) is formed, which functions as a strain sensor, and which comprises a silicon semiconductor substrate is bonded at a central part of the metal base plate 3 with use of metal solder of a metal bonding material 4. The metal base plate 3 is a rectangle extending in an X direction of FIG. 1, and has extending members 11 and 12 sandwiching the bonding area 15 through which the strain sensor chip 2 is bonded. The extending members 11 and 12 have respective connection areas 11' and 12' which are connected to the object 6 to be measured on an undersurface of the metal base plate 3 opposed to the connection area 15. The strain sensor chip 2 is usually as large as the connection area 15 or smaller than that, and is adhered to a central part of the connection area 15. The metal base plate 3 can be made of an alloy of Fe 58-Ni 42 whose thermal expansion coefficient is close to silicon and its size can be 14 mm long, 6 mm wide and 0.3 mm thick. The size of the strain sensor chip 2 can be 2.5 mm long, 2.5 mm wide and 0.16 mm thick.

The strain sensor chip 2 is bonded to the metal base plate 3 with a metal solder 4. On a surface of the strain sensor chip 2 opposed to the metal base plate 3, a metalizing layer comprising three layers of Cr, Ni and Au is formed by sputtering, and a metal solder material of Sn group is vapor-deposited thereon. Also, on a surface of the metal base plate 3 opposed to the strain sensor chip 2, a metalizing layer comprising three layers of Cr, Ni and Au is formed. The strain sensor chip 2 is placed on a central part of the metal base plate 3. Further, the metal solder 4 is heated and melted to bond the strain sensor chip 2 to the metal base plate 3. The metalizing layer comprising three layers can be formed all over the metal base plate.

In order to draw the wiring out of the electrode 16 of the piezoresistive element of the strain sensor chip 2, a flexible wiring board 5 is used. The surface opposite to the side where the wiring at the end of the flexible wiring board 5 is exposed is bonded adjacent to a position where the strain sensor chip is bonded on the metal base plate with use of an epoxy resin adhesive. Between the wiring of the flexible wiring board 5 and the electrode 16 of the sensor chip 2, a bare gold wire 17 having a diameter of 20 micrometers is connected by ultrasonic welding. A covering resin 18 is applied to cover the electrode 16 of the strain sensor chip 2, the gold wire 17, and the wiring of the flexible wiring board 5. As the covering resin 18, a thermosetting resin having a small elastic modulus was used. The resin can be applied to cover the whole strain sensor chip. Since the piezoresistive element of the strain sensor chip is affected by light, it is desirable that the whole strain sensor chip is covered with a colored resin to suppress the influence by light.

On the metal base plate 3, a semiconductor strain sensor 1 to which a strain sensor chip 2 is bonded with the metal solder 4 and on which wiring is formed is attached to an object 6 to be measured. The semiconductor strain sensor 1 is provided at a desired position of the object 6 to be measured. Further, two connection areas 11' and 12' on overhanging members 11 and 12 of the metal base plate 3 are fixed to the object 6 to be measured with use of spot welding of ten spots each. The ten spots of the spot welding are arranged in two rows and five lines. Five welding spots 19 are arranged at regular intervals in the Y direction. The welding point of the third spot is provided on a width central line of the metal base plate 3.

A plurality of piezoresistive elements are formed on the strain sensor chip 2 so that strains in the X and Y directions can be detected. In order to obtain outputs in proportion to strains in the X and Y directions a bridge circuit is prepared with use of the plurality of piezoresistive elements in respective directions. According to the present embodiments, only the piezoresistive element for measuring a strain in the X direction is used. When the object 6 to be measured is pulled in the X direction to generate a strain, it is transmitted to the metal base plate 3 of the semiconductor strain sensor 1 through spot welding points 19 in connection areas 11' and 12'. Then, strains are generated in the metal base plate 3 and the sensor chip 2. Due to a change in resistance of the piezoresistive element, output of an electric signal corresponding to the strain of the object 6 to be measured is obtained. Because of the rigidity of the metal base plate 3 and the strain sensor chip 2, the strain generated in the strain sensor chip 2 does not coincide with the strain of the object 6 to be measured. However, by computing the conversion factor in advance, it can be used as a practical strain sensor.

According to the semiconductor strain sensor 1 of the present embodiment, the strain sensor chip 2 is bonded to the metal base plate 3 with use of a metal material. Therefore, heat generated in the strain sensor chip 2 is conducted to the metal base plate 3 and radiated. The piezoresistive element has high electrical resistance and is likely to generate heat. Further, when an amplifier circuit of CMOS is provided in the strain sensor chip, the amplifier circuit also generates heat. In the semiconductor strain sensor 1, it is easier to conduct the heat to the metal base plate 3 and to radiate it. Therefore, it is possible to minimize the rise in temperature of the strain sensor chip 2 and to keep the temperature of the metal base plate 3 and the strain sensor chip 2 constant, preventing the change in piezo resistance coefficient due to the temperature change and a characteristic change caused by stress change of the piezoresistive element due to thermal deformation caused by unevenness in temperature of the strain sensor chip 2 and the metal base plate 3. If organic materials such as resin adhesives are inserted between the strain sensor chip and the metal base plate or between the metal base plate and the object to be measured, there has been a problem that the organic material comes to have creep and the zero point in the strain detection changes when the strain is given for a long time. Moreover, sometimes, due to degradation and deterioration of the organic material, transfer of the strain was prevented and the strain detection sensitivity was changed. In the semiconductor strain sensor 1 of the present invention, metal solder 4 is used for bonding the strain sensor chip 2 with the metal base plate 3 and welding is used for attachment of the metal base plate 3 and the object 6 to be measured. Thus, it is a strain sensor which can avoid the above characteristic change to be caused by the organic material and is excellent in the long-term stability of the sensor characteristics. Although minute creep may also occur in the metal material used for the bonding, it is very small as compared with the case where the resin adhesive is used. Therefore, the strain sensor 1 is sufficiently effective for long-term stability.

In the semiconductor strain sensor of the present invention the strain sensor chip is connected to the object to be measured with electrically conductive material. Therefore, it is less affected by noise. FIG. 3A shows an equivalent circuit in a case where the strain sensor chip is connected to the object to be measured with use of an electrically conductive material. Also, FIG. 3B shows an equivalent circuit in a case where an insulation material is inserted between the two. As shown in FIG. 3A, in the semiconductor strain sensor of the present invention, a ground of the strain sensor chip can be electrically connected with the object 6 to be measured. Therefore, the ground of the strain sensor chip varies according to a potential of the object 6 to be measured. Thus, a noise is less likely to occur in a sensor chip circuit 21. As in the conventional semiconductor strain sensor, if the insulation material lies between the strain sensor chip and the object 6 to be measured, when a current flows in the object 6 to be measured and the potential changes, as shown in FIG. 3B, each portion of the sensor chip circuit 21 has a parasitic capacitance 22 between itself and the object 6 to be measured. Accordingly, the potential of the sensor chip circuit 21 also varies, allowing a noise to be generated easily.

In the semiconductor strain sensor of the present invention, the strain sensor chip is metal-bonded to the metal base plate, and it can be produced as a module in which a flexible circuit board wiring is connected. In the semiconductor strain sensor of the present invention, by welding the connection area of the extending member to the object to be measured, the strain can be measured. Even to an immobilized object to be measured, the semiconductor strain sensor can be attached by bringing a spot resistance welder to a work site. Moreover, in addition to the spot resistance welding, laser welding or seam welding can be employed. Since the strain sensor chip is attached to the object to be measured through the metal base plate, the risk of damaging the sensor chip or changing the characteristics by giving unnecessary strain could be reduced when mounting it.

EXAMPLE 2

Figure 5:
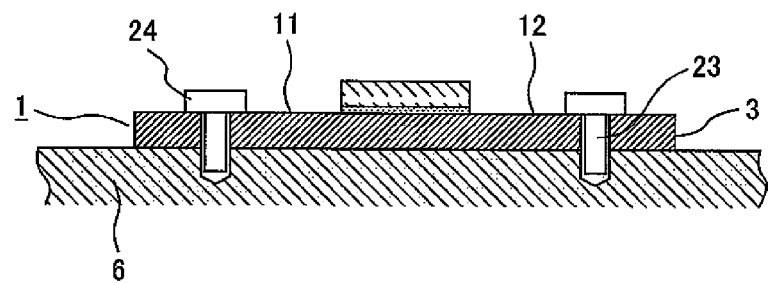
FIG. 5 is a cross-sectional view taken along line V-V of FIG. 4.

Now, a semiconductor strain sensor of Example 2 of the present invention will be explained. FIG. 4 is a plan view of a semiconductor strain sensor 1 of Example 2, attached to the object to be measured. FIG. 5 is a sectional view taken along line V-V of FIG. 4. Bolt holes 23 are formed in two overhanging members 11 and 12 of the metal base plate 3, respectively. The semiconductor strain sensor 1 is fixed to the object 6 to be measured with bolts 24. So long as screw holes can be formed, the screw joint is applicable to ceramics etc. to which welding cannot be performed.

EXAMPLE 3

Figure 6:
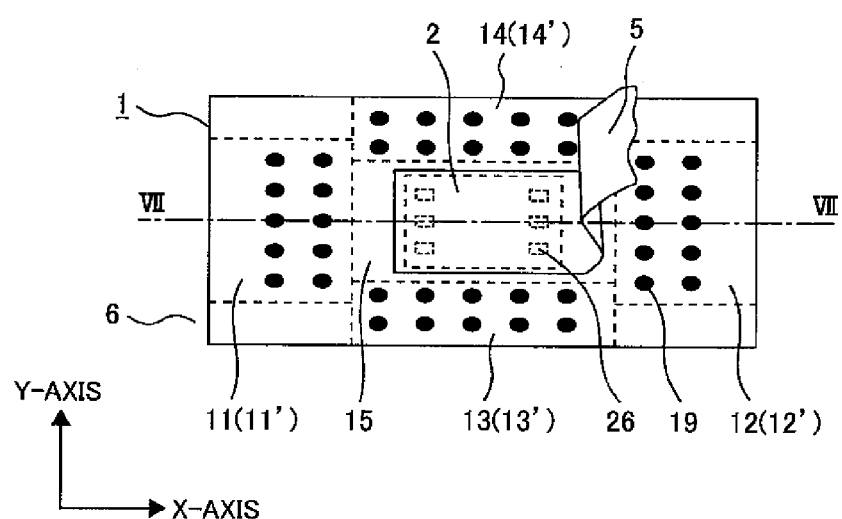
FIG. 6 is a plan view of a semiconductor strain sensor of Example 3 of the present invention, attached to the object to be measured.
Figure 7:
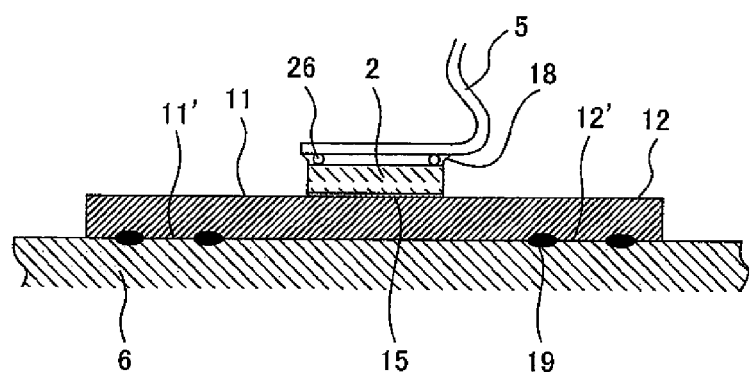
FIG. 7 is a cross-sectional view taken along line VII-VII of FIG. 6.

Now, a semiconductor strain sensor of Example 3 of the present invention will be explained. FIG. 6 is a plan view of a semiconductor strain sensor 1 of Example 3, attached to the object to be measured. FIG. 7 is a cross-sectional view taken along line VII-VII of FIG. 6. As shown in FIG. 6, in addition to two extending members 11 and 12 sandwiching the sensor chip bonding area 15 in the X direction, there are provided two extending members 13 and 14 sandwiching the sensor chip bonding area 15 in the Y direction. The connection areas 11' and 12' of the two overhanging members 11 and 12 in the X direction are connected to the object 6 to be measured with spot resistance welding. At the same time, connection areas 13' and 14' of the two extending members 13 and 14 provided in the Y direction are connected to the object 6 to be measured by spot resistance welding. In FIGS. 6 and 7 the reference numeral 19 designates a welding point. With respect to a strain applied in the X direction of the object 6 to be measured, the strain is transmitted to the strain sensor chip 2 through two connection areas 11' and 12'. With respect to a strain applied in the Y direction, the strain is transmitted to the strain sensor chip 2 through the two connection areas 13' and 14'. In this way the strain applied to the object 6 to be measured can be detected.

Since the connection areas 11', 12', 13', and 14' are provided so as to surround the bonding area 15 of the strain sensor chip 2, the flexible wiring board 5 is provided on the strain sensor chip 2. A metal bump 26 is formed on an electrode of the strain sensor chip 2, and the flexible wiring board 5 is connected there. In order to avoid the directivity of stress of the flexible wiring board 5, the flexible wiring board 5 is so provided as to cover the strain sensor chip 2. A covering resin 18 is applied to a space between the flexible wiring board 5 and the strain sensor chip 2. An epoxy resin was used for the covering resin 18. The covering resin 18 also serves for electric insulation of the wiring member, intercepts the outside air, and increases the bonding capability between the flexible wiring board and the sensor chip. As described above, the flexible wiring board is arranged on the sensor chip. Therefore, when welding the connection area to the object to be measured, the flexible wiring board does not disturb the welding operation.

Figure 8:
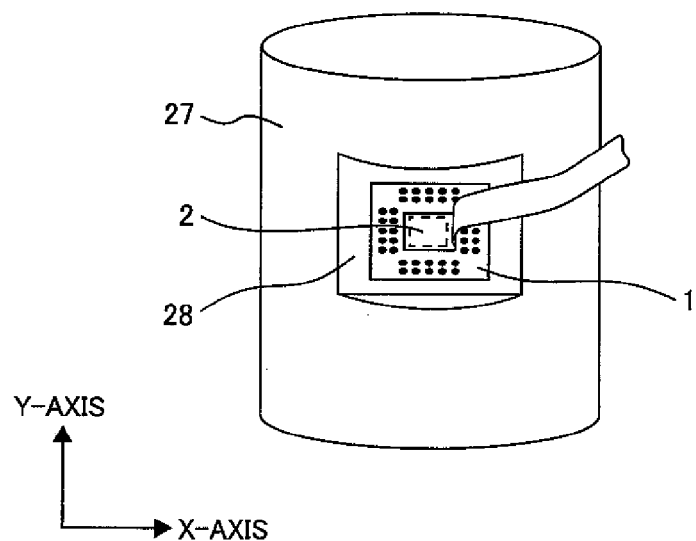
FIG. 8 is a schematic perspective view in which the semiconductor strain sensor of Example 3 is applied to torque detection.

The semiconductor strain sensor of Example 3 is also suited to torque detection. An example of the torque detection is shown in FIG. 8. A pillar member 27 to which torque is applied is used as an object to be measured. A notch slot 28 is formed in a side face of the pillar member, and a semiconductor strain sensor 1 is attached to a flat bottom of the slot. The semiconductor strain sensor of the present embodiment is fixed to the pillar member 27 of the object to be measured by welding through four connection areas around the strain sensor chip. The strain is transmitted from the object to be measured in the X and Y directions. Therefore, shearing strain caused by torsion of the object to be measured is transmitted to the strain sensor chip 2, and the shearing strain proportional to the torque can be obtained by calculation. The semiconductor strain sensor of the present embodiment has a piezoresistive element arranged in the X direction, and a piezoresistive element arranged in the Y direction. However, it is possible to use a strain sensor chip in which the piezoresistive element is provided in a direction making an angle of 45 degrees with X and Y directions. With use of the strain sensor chip, the strain in the shearing direction can be directly measured.

EXAMPLE 4

Figure 9:
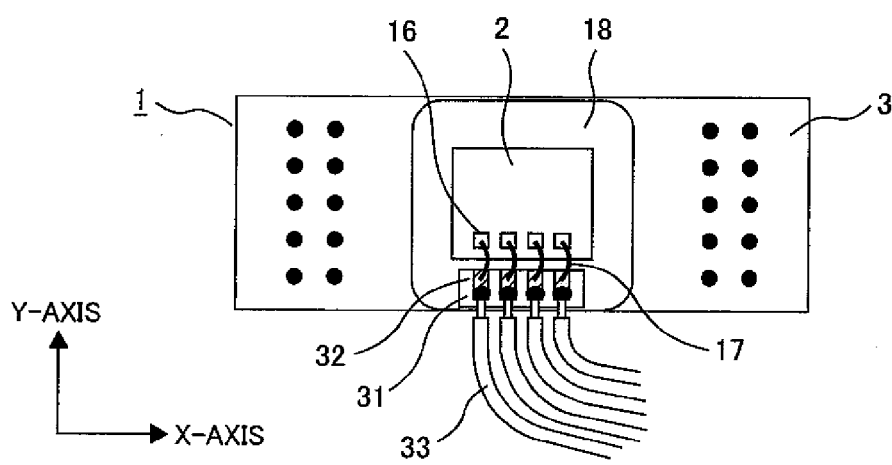
FIG. 9 is a plan view of a semiconductor strain sensor of Example 4 of the present invention.

The semiconductor strain sensor 1 of Example 4 according to the present invention will be described. FIG. 9 is a plan view showing the semiconductor strain sensor of Example 4. A base plate electrode 32 is formed on a metal base plate 3 through an insulating film 31. The base plate electrode 32 is connected with the electrode 16 of the strain sensor chip 2 by a gold wire 17. Also, a tip portion prepared by removing the coating from a coated wiring 33 is soldered to the base plate electrode 32. A covering resin 18 is applied to cover the strain sensor chip 2 including the wiring member. When a stress caused by the resin is large, the covering resin may be applied to a wiring member alone or to the wiring member and a position symmetrical to the wiring member. According to the present embodiment, by using the metal base plate 3 on which the base board electrode 32 is formed beforehand, the flexible wiring board becomes unnecessary. At the same time, it becomes possible to omit assembly processes such as bonding the flexible wiring board to the metal base plate. It is a wiring draw-out structure suited to a case where there are few wirings to be drawn out.

EXAMPLE 5

Figure 10:
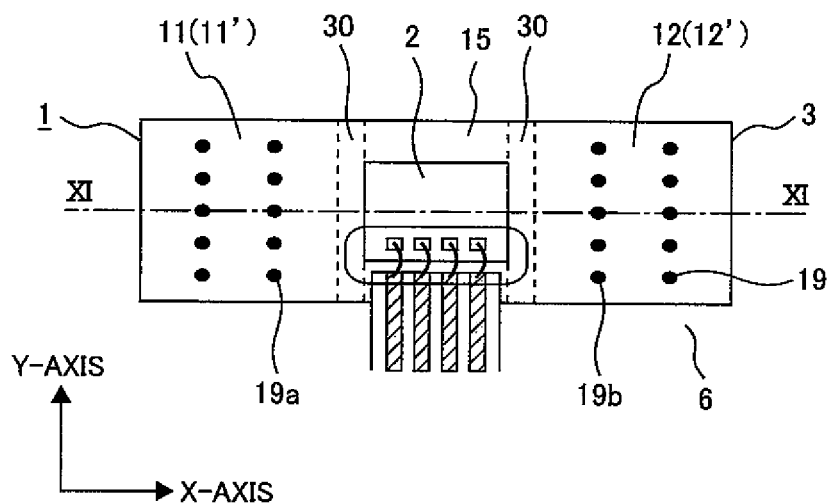
FIG. 10 is a plan view of a semiconductor strain sensor of Example 5 of the present invention, attached to the object to be measured.
Figure 11:
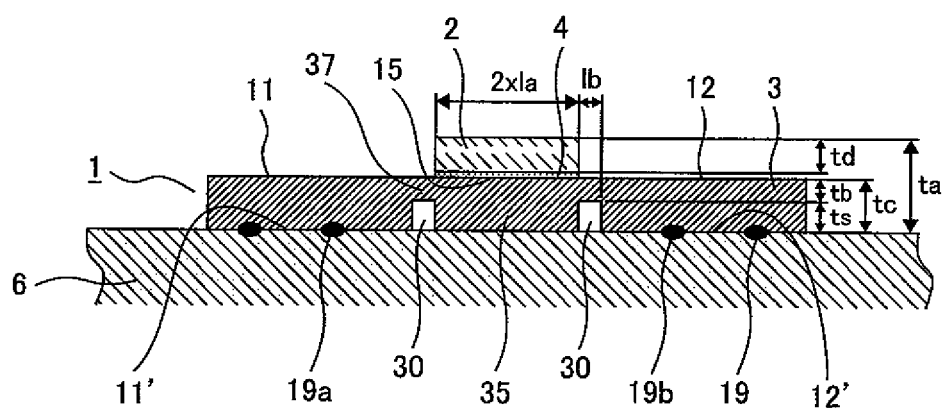
FIG. 11 is a cross-sectional view taken along line XI-XI of FIG. 10.

With reference to FIGS. 10 and 11, the semiconductor strain sensor of Example 5 of the present invention will be described. FIG. 10 is a plan view showing the semiconductor strain sensor 1 of Embodiment 5 attached to the object to be measured, and FIG. 11 is a cross-sectional view taken along line XI-XI of FIG. 10. On a central part of the metal base plate 3, with use of metal solder 4 of the metal bonding material, there is bonded the strain sensor chip 2 comprising a silicon semiconductor substrate which functions as the semiconductor strain sensor in which the piezoresistive element (not shown) is formed. From an electrode of the piezoresistive element of the strain sensor chip 2, as shown in Example 1, a wiring is drawn out using the flexible wiring board. The metal base plate 3 is a rectangle extending in the X direction of FIG. 10. The metal base plate 3 has extending members 11 and 12 sandwiching a bonding area 15 with which the strain sensor chip 2 is bonded. The overhanging members 11 and 12 have connection areas 11' and 12', respectively, which are connected to the object 6 to be measured and provided on an undersurface of the metal base plate 3 opposed to the bonding area 15. Along a line on the undersurface of the metal base plate corresponding to aside of the bonding area 15 bonded to the metal base plate 3, grooves 30 are formed respectively in the undersurface of the metal base plate. Of side walls of the groove 30, a side wall closer to the bonding area is so provided as to match a line on the undersurface of the metal base plate corresponding to the side of the bonding area 15. The groove 30 is longer than a width (a length in the Y direction) of the semiconductor sensor chip 2, and is as long as a width of the metal base plate 3. On the undersurface of the metal base plate 3, there are arranged the connection area 11' of the extending member 11, the groove 30, a protruding section 35 placed between the two grooves, the groove 30, and the connection area 12' of the extending member 12, in this order.

The side wall close to the strain sensor chip 2 of the groove 30 substantially matches a position of the side of the strain sensor chip. Therefore, a length of the protruding section 35 in the X direction is substantially the same as a length of the bonding area 15 of the strain sensor chip 2 in the X direction. The metal base plate 3 is made of an alloy of Fe 58-Ni 42, and it can be 14 mm long, 6 mm wide, and 0.3 mm thick. The strain sensor chip 2 can be 2.5 mm long, 2.5 mm wide, and 0.16 mm thick. A width lb of the groove 30 is 0.3 mm and its depth is is 0.18 mm. Each of the two bonding areas 11' and 12' is 5.45 mm long and 6 mm wide. The protruding section 35 is 2.5 mm long and 6 mm wide.

The strain sensor chip 2 is bonded to the metal base plate 3 with use of the metal solder 4. On the surface, opposed to the metal base plate, of the strain sensor chip 2, there is formed a metalizing layer comprising three layers of Ti, Pt and Au by sputtering, and a metal solder material of Sn series is vapor-deposited thereon. Also, on the surface, opposed to the strain sensor chip, of the metal base plate 3, a metalizing layer comprising three layers of Ti, Pt, and Au is formed. The strain sensor chip 2 is positioned at the center of the bonding area 15 of the strain sensor chip 2. Then, metal solder 4 is heated and melted to bond the strain sensor chip 2 to the metal base plate 3. The metalizing layer of three layers can be formed on the whole surface of the metal base plate.

In the semiconductor strain sensor 1 of Example 5, the groove 30 is formed in the metal base plate 3. Therefore, there is a favorable symmetrical relationship of rigidity between the front surface and the back surface of the semiconductor strain sensor. Moreover, when the object 6 to be measured is deformed in an XY plane, the groove can prevent the area 15 through which the strain sensor chip 2 of the metal base plate 3 is bonded from being deformed. Therefore, the conversion factor of the strain generated in the strain sensor chip according to the strain of the object to be measured is stable within a strain measuring range.

A portion of the metal base plate 3 thinned by the groove 30 formed in the metal base plate 3 is indicated as a link part 37. The protruding section 35 is arranged under the bonding area 15 with which the strain sensor chip 2 is bonded to the metal base plate 3. Therefore, the symmetrical characteristic of the rigidity between the front surface and the back surface of the semiconductor strain sensor 1 is improved. For example, when a tensile strain in the object 6 to be measured is generated, a force is transmitted to the metal base plate 3 through a welding point 19 and, further, transmitted to the bonding area 15 of the strain sensor chip 2 through the link part 37. There is the semiconductor strain sensor chip 2 on the metal base plate 3. Also, there is the protruding section 35 under the metal base plate 3. Since they are symmetrical to each other, the bonding area 15 and the connection areas 11' and 12' are prevented from being bent upward or downward by the force transmitted through the link part 37. Therefore, the state of contact between the metal base plate 3 and the object 6 to be measured as well as the state of contact between the metal base plate 3 and the strain sensor chip 2 does not change. Further, the relationship between the strain of the object 6 to be measured and the strain of the sensor chip 2 is maintained within the measuring range, and the conversion factor between them can be kept constant.

Since the strain sensor chip 2 and the protruding section 35 have the symmetrical characteristic in rigidity, it is desirable that the protruding section 35 is as long as the strain sensor chip 2. Accordingly, in the semiconductor strain sensor 1 of Example 5, the groove is provided along a line on the undersurface of the metal base plate corresponding to both sides of the strain sensor chip 2. Further, of side walls of the groove, a side wall closer to the bonding area 15 is provided along the line.

Moreover, it is desirable that the rigidity of the strain sensor chip 2 is the same as that of the protruding section 35 of the metal base plate 3. Therefore, each Young's modulus is allowed to be equal to a value worked out by multiplying thicknesses. That is, the formula is satisfied as follows:

$$Ed \times td = Es \times ts$$

where
Ed: Young's modulus of the strain sensor chip 2,
td: a thickness,
Es: Young's modulus of the metal base plate 3, and
ts: a height of the protruding section 35 (depth of the groove 30).

Each value applied is as follows:
Ed (Young's modulus of the strain sensor chip 2 made of silicon): 169 GPa,
Es (Young's modulus of the metal base plate 3 made of Fe—Ni alloy): 150 GPa,
td (a thickness of the strain sensor chip 2): 0.16 mm, and
ts (a thickness of the protruding section 35): 0.18 mm Therefore, the above relationship is satisfied. When the conversion factor of a strain was measured by using the semiconductor strain sensor 1, the conversion factor of the strain was about 0.63, and the measuring range of the strain was $\pm 500 \times 10^{-4}$%, the strain conversion factor being substantially constant.

In Example 5, as in Example 1, the metal base plate 3 is welded to the object 6 to be measured by spot resistance welding. It is desirable that the welding point in the connection area is close to the strain sensor chip 2. As shown in FIG. 11, suppose that a welding point 19 closest to the strain sensor chip 2 in the connection area 11' is a first welding point 19*a* and a welding point 19 closest to the strain sensor chip 2 in the connection area 12' is a second welding point 19*b*. A force is applied by the strain generated in the object 6 to be measured to an area between the first welding point 19*a* and the second welding point 19*b* of the metal base plate 3, which generates a strain. The closer to the strain sensor chip 2 the first welding point 19*a* and the second welding point 19*b* are, the shorter the area of the metal base plate 3 to which the force is applied can be. Therefore, it becomes possible to prevent the metal base plate from being flexural deformed.

Moreover, between the first welding point 19*a* and the second welding point 19*b*, the rigidity in a cross section of a portion of the groove 30 is different from the rigidity in a cross section of a portion of the bonding area 15 of the strain sensor chip. Therefore, strains generated are also different. When manufacturing a plurality of semiconductor strain sensors, if a position of the first welding point 19*a* and a position of the second welding point 19*b* are different, the areas of the connection areas 11' and 12' may vary among the semiconductor sensors, and distribution of the strain changes. Thus, the strain generated in the strain sensor chip changes. If the positions of the first and second welding points 19*a* and 19*b* change, the conversion factor of the strain may change among those semiconductor strain sensors. If sum total of the rigidity of a portion of the metal base plate placed between two grooves 30 of the strain sensor chip 2 and the rigidity of the two link parts 37 of the metal base plate are allowed to be equal to the rigidity of the extending members 11 and 12, the distribution of the strain can be made constant with respect to change in length of the connection area that receives a force. Thus, regardless of the position of the welding point, the conversion factor of the strain can be made constant.

As shown in FIG. 11, a favorable width lb of the groove 30 can be expressed as follows:

$$lb = la \times [tb \times (ta-tc)]/[ta \times (tc-tb)]$$

where ta: a thickness of the semiconductor strain sensor 1 in the bonding area 15 of the metal base plate 3, tb: a thickness of the link part 37, tc: a thickness of the extending members 11 and 12, and la×2: length of the strain sensor chip 2.

In this regard, Young's modulus of the strain sensor chip 2 and Young's modulus of the metal base plate 3 are different. Therefore, it is necessary to correct the thickness of the strain sensor chip 2 in advance. Here, the thickness td in which the strain sensor chip 2 is converted to the metal base plate is 0.18 mm. The preferable width lb of the groove 30 is worked out by the above formula with use of the following values:

ta (a thickness of the semiconductor strain sensor 1): 0.48 mm, tb (a thickness of the link part 37): 0.12 mm tc (a thickness of the extending members 11 and 12): 0.3 mm, and la×2 (a length of the strain sensor chip 2): 2.5 mm.

Figure 12:
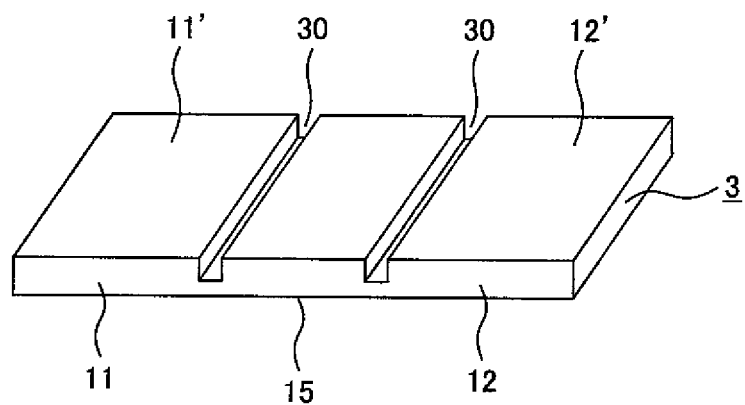
FIG. 12 is a perspective view of a metal base plate used for the semiconductor strain sensor of Example 5, viewed from the bottom.

FIG. 12 is a perspective view showing the metal base plate 3 as viewed from a back surface of a surface where the strain sensor chip is bonded and. Two grooves 30 are so formed as to cross the metal base plate 3 in its width direction. The grooves 30 were formed by chemical etching. The grooves 30 can also be formed by machine cutting of the metal or press processing.

Figure 13:
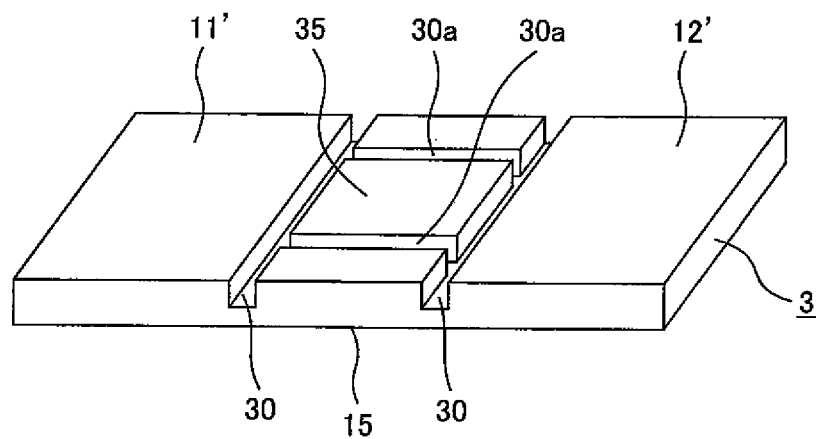
FIG. 13 is a perspective view showing a modification of the metal base plate which can be used for the semiconductor strain sensor of Example 5, viewed from the bottom.

FIG. 13 is a perspective view, showing from below, a modification of the previously described metal base plate which can be used in the semiconductor strain sensor 1 of the present invention. In the metal base plate 3, there are formed two grooves 30 extending in the width direction and two grooves 30a extending perpendicularly to the grooves 30. A side wall closer to the strain sensor chip of the groove 30a is so provided as to match a side in the Y direction of the strain sensor chip. The metal base plate 3 of FIG. 13 can be used also for the semiconductor strain sensor explained in Example 3.

EXAMPLE 6

Figure 14:
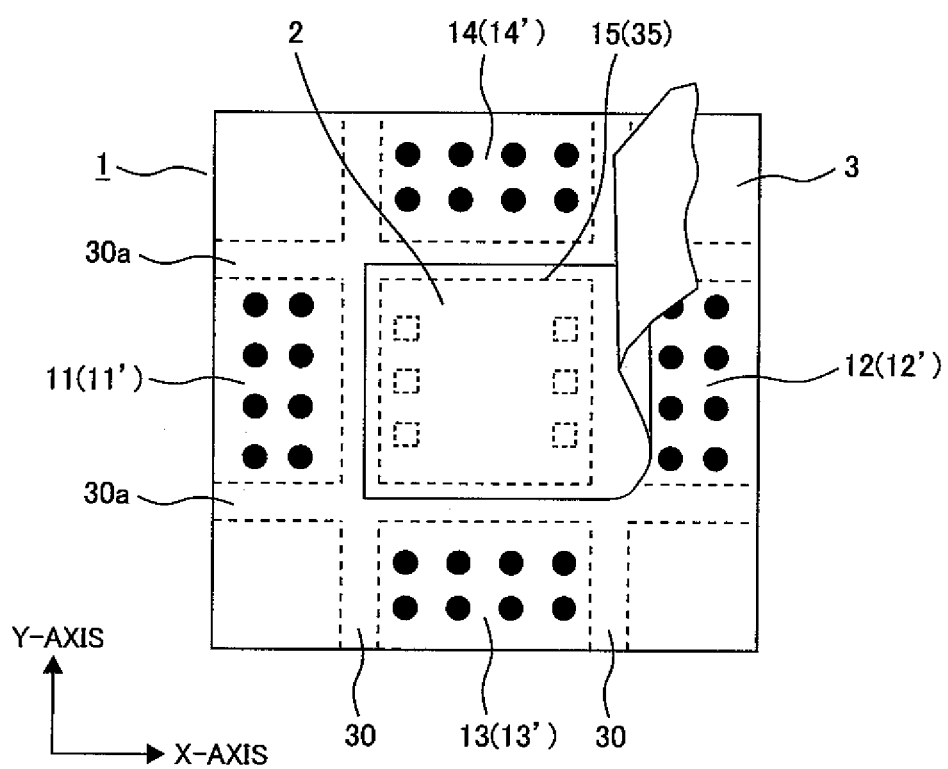
FIG. 14 is a plan view of a semiconductor strain sensor of Example 6 of the present invention.

With reference to FIG. 14, a semiconductor strain sensor 1 of Example 6 of the present invention will be explained. As shown in a plan view of FIG. 14, in addition to two extending members 11 and 12 sandwiching the bonding area 15 of the strain sensor chip in the X direction, there are provided two extending members 13 and 14 sandwiching the bonding area 15 of the strain sensor chip 2 in the Y direction. The extending members 11, 12, 13, and 14 have respective connection areas 11', 12', 13', and 14' on the undersurface of the metal base plate 3. There are formed grooves 30 and 30a between an area on the undersurface of the metal base plate 3 corresponding to the bonding area 15 and the connection area 11', 12', 13', and 14'. An outer shape of the protruding section 35 surrounded by a side wall close to the strain sensor chip 2 of the four grooves 30 and 30a is allowed to be the same as an outer shape of the strain sensor chip 2. Then, the strain sensor chip 2 is bonded to a position on the metal base plate corresponding to the protruding section 35. The connection areas 11', 12', 13', and 14 are fixed to the object 6 to be measured by spot resistance welding. The strain applied in the X direction of the object 6 to be measured is transmitted to the strain sensor chip 2 through the extending members 11 and 12. Further, the strain applied in the Y direction is transmitted to the strain sensor chip 2 through the extending members 13 and 14. Thus, the amount of strain applied to the object to be measured can be detected.

EXAMPLE 7

Figure 15A:
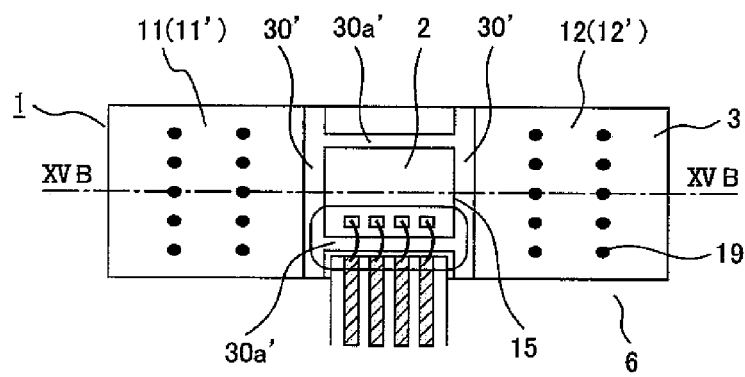
FIG. 15A is a plan view of a semiconductor strain sensor of Example 7 of the present invention, attached to the object to be measured.
Figure 15B:
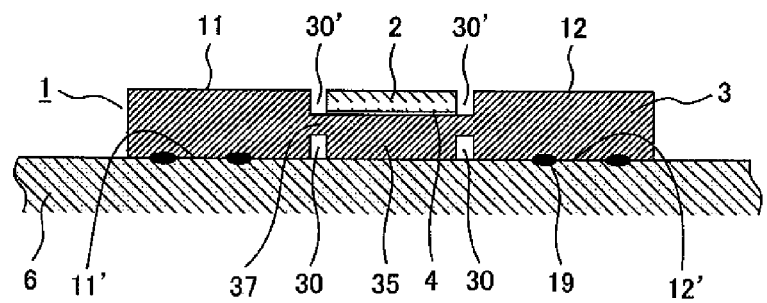
FIG. 15B is a cross-sectional view taken along line XVB-XVB of FIG. 15A.
Figure 15C:
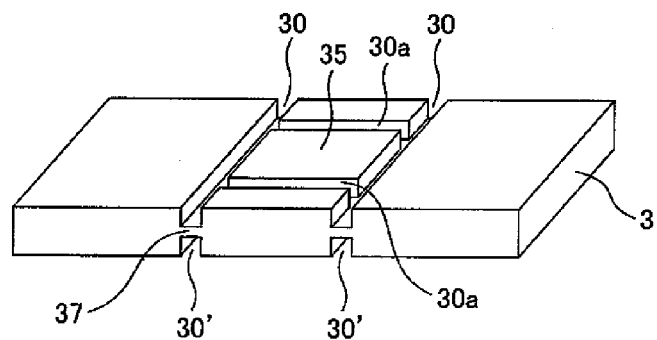
FIG. 15C is a perspective view of the metal base plate used for the semiconductor strain sensor of the case of Example 7 viewed from the bottom.
Figure 15D:
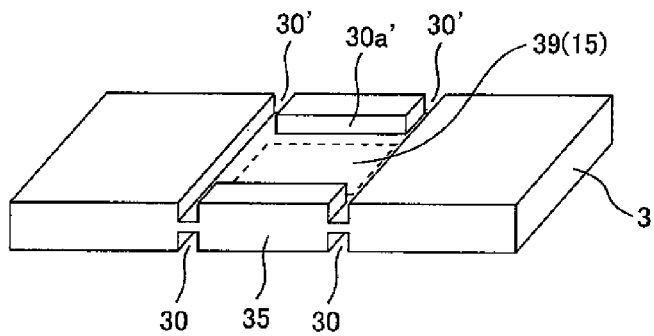
FIG. 15D is a perspective view of the metal base plate, viewed from the top.
Figure 16A:
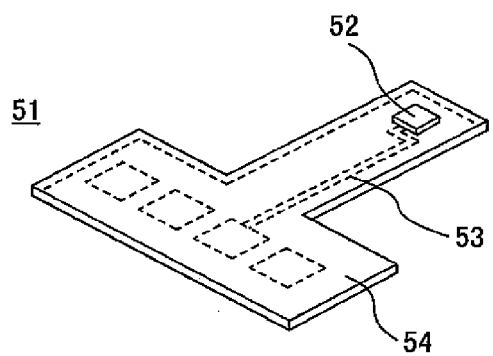
FIG. 16A is a perspective view of the semiconductor strain gauge disclosed in a document.
Figure 16B:
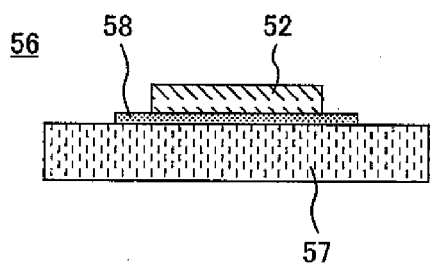
FIG. 16B is a perspective view of the semiconductor strain detection sensor disclosed in another document.
Figure 17A:
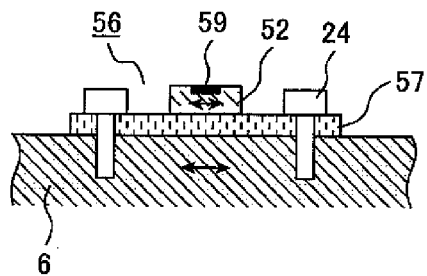
FIG. 17A is a cross-sectional view of a strain detection sensor attached to an object to be measured with bolts.
Figure 17B:
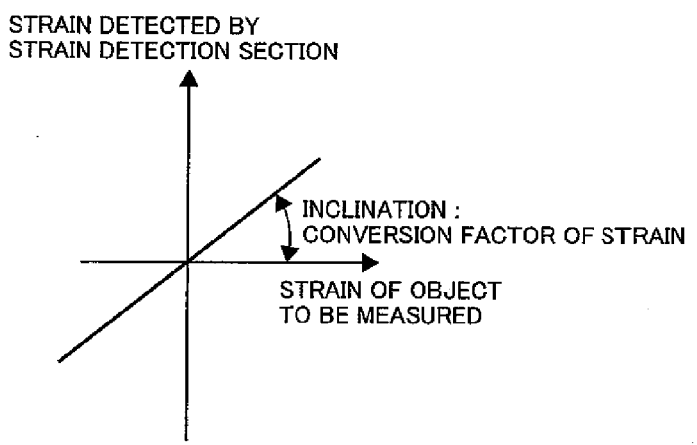
FIG. 17B is a graph explaining a relationship between a strain of the object to be measured and a strain to be detected.
Figure 18:
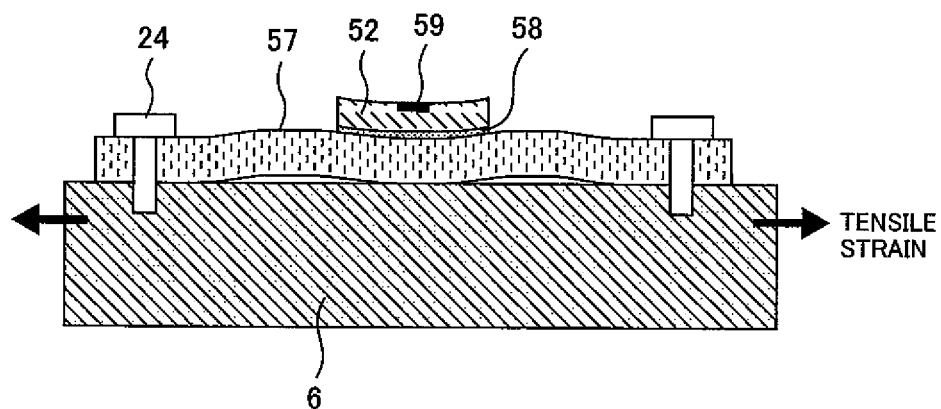
FIG. 18 is a diagram schematically illustrating flexural deformation generated in a pedestal.

With reference to FIGS. 15A to 15D, a semiconductor strain sensor 1 of Embodiment 7 of the present invention will be explained. Example 7 is different from Example 1 in that the rigidity balance of the front and back surfaces of the metal base plate is further improved. FIG. 15A is a plan view of the semiconductor strain sensor 1 of Example 7 attached to the object 6 to be measured. FIG. 15B is a cross-sectional view taken along line XVB-XVB of FIG. 15A. FIG. 15C is a perspective view in which the metal base plate 3 used for the semiconductor strain sensor 1 of Example 7 is viewed from the back side. FIG. 15D is a perspective view in which the metal base plate 3 is viewed from the front side. There is a connection area 15 in the center of the metal base plate 3 and a strain sensor chip 2 is attached thereon with metal solder 4. The metal base plate 3 has extending members 11 and 12 protruding from the right and left sides of the strain sensor chip 2. Further, the metal base plate has connection areas 11' and 12', on the undersurface of the extending members 11 and 12, for the connection to the object 6 to be measured. In the undersurface of the metal base plate 3, there are provided two grooves 30 separating an area on the undersurface corresponding to the bonding area 15 from the connection areas 11' and 12' of the extending members 11 and 12 between sides in the Y direction of the metal base plate 3. Moreover, along a line on the undersurface corresponding to a side in the Y direction of the bonding area 15, there are provided two grooves 30a (see FIG. 15C) in the undersurface of the metal base plate 3. The grooves 30a are each provided perpendicularly to the groove 30, and the groove 30a extend from one groove 30 to the other groove 30. On the undersurface of the metal base plate 3, there is formed a protruding section 35 surrounded by the two grooves 30 and two grooves 30a.

In the upper surface of the metal base plate 3, with respect to a plane in the center of a thick part of the metal base plate, there are formed two grooves 30' and two grooves 30a' arranged in a symmetrical relationship to the two grooves 30 and the two grooves 30a provided in the undersurface of the metal base plate 3. The depth of the grooves 30 and 30a in the undersurface of the metal base plate 3 is equal to the depth of the grooves 30' and 30a' in the upper surface. A portion surrounded by the four grooves 30' and 30a' in the upper surface serves as a recess 39 whose depth is equal to the depth of the groove. Also, a bottom of the recess 39 serves as the bonding area 15 for bonding the strain sensor chip 2. The strain sensor chip 2 is bonded to the bonding area 15 with use of metal solder 4.

The strain sensor chip 2 is placed in the recess 39. Therefore, the strain sensor chip 2 is arranged in a symmetrical relationship to the protruding section 35 on the undersurface of the strain sensor chip 2, improving the symmetrical characteristic of rigidity.

The invention claimed is:

1. A semiconductor strain sensor comprising:
   a semiconductor strain sensor chip comprised of a semiconductor substrate including a piezoresistive element formed on an upper surface thereof;
   a metal base plate having a bonding area to which an undersurface of the semiconductor strain sensor chip is bonded, the metal base plate including at least two extending members, which protrude from sides of the bonding area and have connection areas on undersurfaces of the metal base plate for attaching the strain sensor chip to a surface of an object to be measured;

wherein said metal base plate and said extending members are unified and include a pair of first grooves on the undersurface thereof located, respectively, at opposite ends of said bonding area, said first grooves extending perpendicularly to a strain direction over the entire width of said metal base plate, and wherein said first grooves are configured to prevent said bonding area, through which said strain sensor chip is bonded to said metal base plate, from being bent when said object to be measured is bent in an XY plane, and a wiring member connected to an electrode of the piezoresistive element of the strain sensor chip being drawn outward.

2. A semiconductor strain sensor comprising:

a semiconductor strain sensor chip comprised of a semiconductor substrate including a piezoresistive element formed on an upper surface thereof;

a metal base plate having a bonding area to which an undersurface of the semiconductor strain sensor chip is bonded, the metal base plate including at least two extending members, which protrude from sides of the bonding area and have connection areas on undersurfaces of the extending members of the metal base for attaching the semiconductor strain sensor chip to a surface of an object to be measured;

wherein said metal base plate and said extending members are unified and includes a pair of first grooves on the undersurface thereof located, respectively, at opposite ends of said bonding area, said first grooves extending perpendicularly to a strain direction over the entire width of said metal base plate, and wherein said first grooves are configured to prevent said bonding area, through which said semiconductor strain sensor chip is bonded to said metal base plate, from being bent when said object to be measured is bent in an XY plane, a wiring member connected to an electrode of the piezoresistive element of the semiconductor strain sensor chip being drawn outward, and said metal base plate includes a pair of upper grooves on the upper surface of the metal base plate, in addition to said first grooves, which is arranged in a corresponding relationship to said first grooves in the undersurface of the metal base plate with respect to a plane on a central part of the metal base plate; and wherein said bonding area formed between said upper grooves is recessed from the upper surface, and a total depth of said first grooves and said upper grooves is set to prevent said metal base plate and said extending members from being bent even when a stress is applied thereto.

3. A semiconductor strain sensor according to claim 1, wherein said wiring member comprises;

a flexible wiring board including one end adhered onto the metal base plate with a resin;

a metal wire electrically connecting a wiring of the flexible wiring board with the electrode of the piezoresistive element of the strain sensor chip; and a resin covering the electrode of the piezoresistive element and the metal wire.

4. A semiconductor strain sensor according to claim 1, wherein said wiring member comprises:

a metal bump provided on the electrode of the piezoresistive element of the strain sensor chip;

a flexible wiring board including a wiring electrically connected to the metal bump; and a resin filled between the strain sensor chip and the flexible wiring board.

5. A semiconductor strain sensor according to claim 1, wherein said wiring member comprises:

a base plate electrode formed on the metal base plate through an insulation film;

a metal wire electrically connecting the base plate electrode with the electrode of the piezoresistive element of the strain sensor chip; and a resin covering the electrode of the piezoresistive element, the metal wire, and the base plate electrode.

6. A semiconductor strain sensor according to claim 1, wherein said metal base plate includes second grooves extending perpendicularly to said first grooves and having the same depth as said first grooves.

7. A semiconductor strain sensor according to claim 1, wherein said first grooves are configured to cause predetermined favorable symmetrical relationship of rigidity between the front surface and the back surface of said semiconductor strain sensor.

8. A semiconductor strain sensor according to claim 2, wherein said first grooves cause a favorable symmetrical relationship of rigidity between the front surface and the back surface of said semiconductor strain sensor.

9. A semiconductor strain sensor according to claim 1, wherein the semiconductor strain chip is bonded with a metal bonding material to the metal base plate.

10. A semiconductor strain sensor according to claim 2, wherein the semiconductor strain sensor chip is bonded with a metal bonding material to the metal base plate.

* * * * *